UNITED STATES PATENT OFFICE.

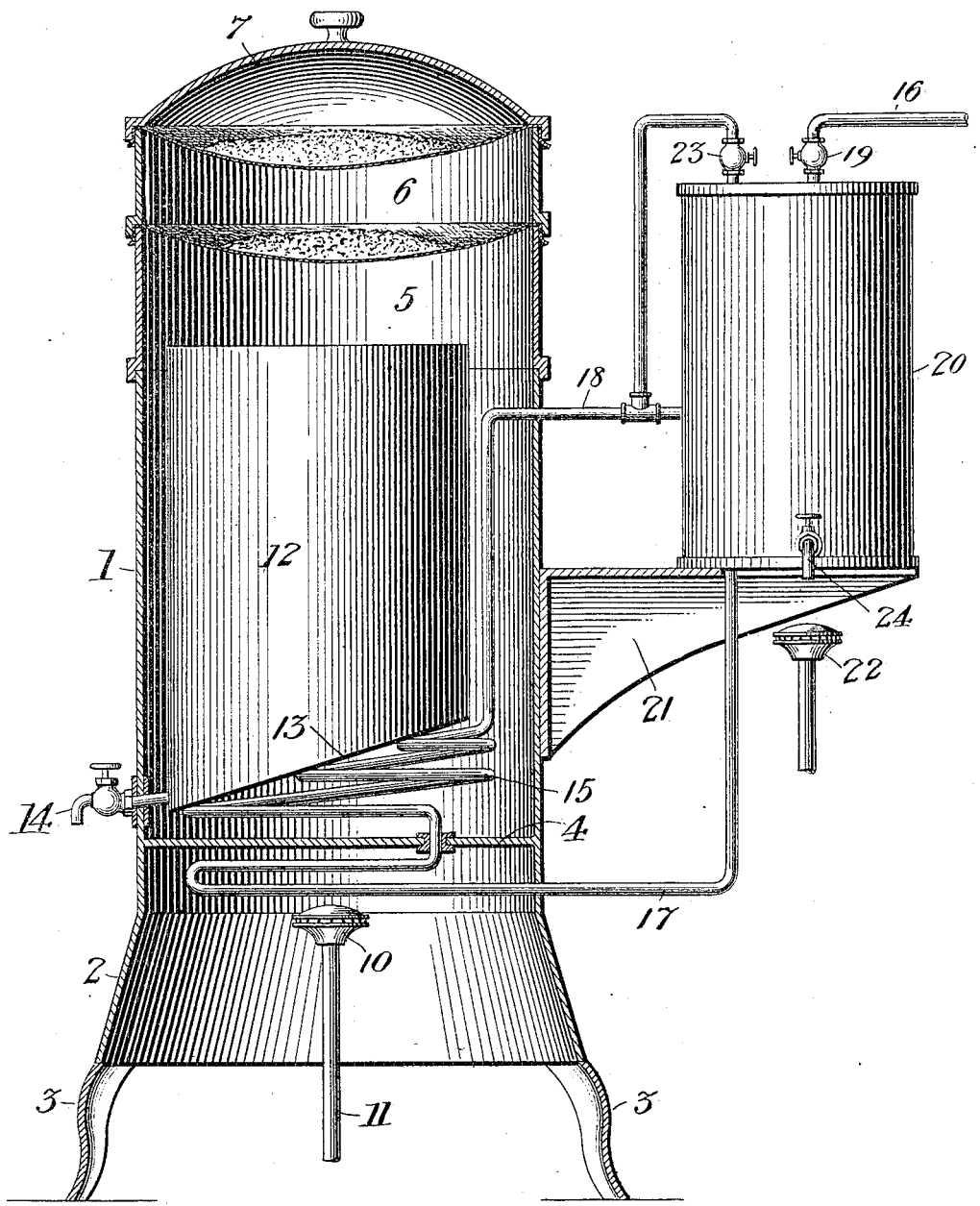

DANIEL O. DOWE, OF MONTGOMERY, ALABAMA.

COFFEE-URN.

No. 830,771.　　　　Specification of Letters Patent.　　　Patented Sept. 11, 1906.

Application filed August 31, 1905. Serial No. 276,561.

*To all whom it may concern:*

Be it known that I, DANIEL O. DOWE, a citizen of the United States, residing at Montgomery, in the county of Montgomery and State of Alabama, have invented certain new and useful Improvements in Coffee-Urns, of which the following is a specification.

My invention relates to urns that are adapted to be used in making coffee and for keeping the same hot and ready for use without deterioration for a considerable period of time, as is desirable in cafés, hotels, &c.

My improved device has for its principal object the more rapid and convenient preparation of coffee according to the scientifically correct process, an improved holder for keeping the same hot and ready for instant use, and, in conjunction therewith, a water-supply system wherein water in reserve is adapted to be kept hot by the same source of heat that keeps the prepared coffee heated, thus resulting, further, in an economy of fuel.

A preferred embodiment of my invention is illustrated in the accompanying drawing, wherein the figure shows a central vertical section of the device as assembled for use.

In said figure, 1 designates the outer shell of the urn, having, as shown, a flaring lower portion 2 extended below its bottom 4 and provided with suitable legs 3. 5 and 6 are sections, either or both of which are adapted to be placed on the top of shell 1, said sections having annular flanges at their bottoms adapted to fit over the top of shell 1 or of each other.

A cover 7 has a similar flange which fits over the top of shell 1 or either section 5 or 6. Said sections 5 and 6 are principally intended for use in making coffee, at which time straining-cloths are placed over the top of sections 5 and 6 and gripped in place by crowding the flanges down, so as to catch the cloths between a section and the flange which engages therewith, as shown. The upper cloth is a more coarsely woven one than the lower one, this arrangement of strainers being desirable for a purpose hereinafter explained.

10 is a source of heat-supply disposed centrally beneath the bottom 4 of shell 1 and in the present instance is shown as a gas-burner supplied by pipe 11.

12 is an inner receptacle or crock having an inclined bottom 13, with a cock 14 at the lowest point thereof. It will be understood that in this receptacle or crock 12 the coffee is kept hot ready for use after the same is made, and by the provision of inclined bottom 13 and cock 14 at the lowest point thereof the contents of said crock can be completely drawn off. A further utility of said inclined bottom 13 is that it provides room for the coil of pipe 15, which is disposed near the bottom of shell 1 and upon which the crock 12 rests.

From the lower end of said coil 15 a pipe 17 extends through the bottom 4, underneath which it preferably passes back and forth adjacent to or forms a coil above or around burner 10. It then leads to an auxiliary tank or boiler 20, which may be conveniently supported on a bracket 21, projecting from the side of urn 1. A second source of heat, such as a gas-burner 22, is located beneath the tank 20.

A pipe 16, connected with a source of water-supply and provided with a stop-cock or valve 19, serves to furnish fresh water to said tank, and from the other end of coil 15 a pipe 18 extends upwardly alongside crock 12, then out through the wall of urn 1, and to the top of tank 20, where it is provided with a stop-cock or valve 23. This arrangement provides for a constant circulation of hot water from tank 20 through pipe 17, coil 15, and pipe 18 back to said tank. The function of tank 20 is to supply boiling water for the making of coffee, a faucet 24 being provided for the purpose, and it will be seen that by the arrangement described but little time and a small quantity of gas from burner 22 are required to raise the incoming water to the necessary temperature, since the burner 10 has previously heated the same in the reservoir formed by coils 15 17.

In the making of coffee with my improved apparatus the ground coffee is stirred into boiling water from tank 20. The liquid coffee is strained out into crock 12 by means of the strainers above described, the upper coarse strainer separating the grounds and the lower and finer one removing all sediment and clarifying the coffee. I find that the use of coarse and fine strainers, as described, renders the straining process more expeditious, as well as more perfect, than any other arrangement, and it will be seen that the manner whereby I secure the strainer-cloths in place enables the same to be readily removed and cleansed, there being no wire or other support attached to the same.

Ordinarily the upper sections 5 and 6 will be removed when the straining is completed;

but, if desirable, they may be employed to increase the capacity of the shell 1, the coffee-receptacle being enlarged to hold a greater quantity.

It will be seen from the above that I secure from burner 10 the double function of keeping the prepared coffee hot and also a supply of fresh hot water in reserve, thus economizing both in fuel and time when coffee is to be made.

Having thus described my invention, and without desiring to be limited to the precise details of construction shown and described, what I claim is—

1. In an apparatus of the character described, a coffee-receptacle, means for supplying heat thereto, a reservoir for holding fresh water and a circulation system in series with said reservoir and comprising a coil adjacent to said source of heat, the arrangement being such that the coffee is kept hot and fresh water heated from a single source of heat.

2. In combination, a coffee-receptacle, a burner beneath the same, a coil of pipe, adapted to be connected with a source of water under pressure, interposed between said receptacle and said burner, and a supply-reservoir in series connection with said coil, substantially as described.

3. In combination, an outer shell, a coffee-receptacle disposed therein and having an inclined bottom, a coil of pipe disposed in said shell and presenting an upper surface designed to support said inclined bottom of the receptacle, a supply-reservoir in series connection with said coil and a burner underneath said shell and coil, substantially as described.

4. In combination, an outer shell, a coffee-receptacle disposed therein, a coil of pipe disposed beneath said receptacle in said shell, a burner beneath said shell, an auxiliary tank adjacent said shell and having series connection with said coil of pipe and a burner beneath said tank, substantially as described.

5. In combination, an outer shell, a coffee-receptacle disposed therein, a coil of pipe disposed beneath said receptacle, a burner beneath said shell and adapted to heat the contents thereof and of said coil of pipe, an auxiliary tank connected in series with said coil, so as to permit of a circulation of hot water therethrough, a source of water-supply for said tank, a second burner beneath said tank, a faucet to permit boiling water to be drawn from said tank and means to support a plurality of strainers above said receptacle, substantially as described.

In testimony whereof I have affixed my signature in presence of two witnesses.

DANIEL O. DOWE.

Witnesses:
W. J. BLACK,
CHAS. J. FAY.